United States Patent [19]

Shinagawa

[11] Patent Number: 4,965,802
[45] Date of Patent: Oct. 23, 1990

[54] MEMORY ARRANGEMENT UTILIZED FOR IC CARD

[75] Inventor: Tohru Shinagawa, Toride, Japan

[73] Assignee: Hitachi Maxell, Ltd., Osaka, Japan

[21] Appl. No.: 244,861

[22] Filed: Sep. 15, 1988

[30] Foreign Application Priority Data

Sep. 17, 1987 [JP] Japan .................................. 62-233333

[51] Int. Cl.$^5$ ........................ G06F 11/10; G06K 5/00
[52] U.S. Cl. .................................. 371/51.1; 235/380; 371/40.1
[58] Field of Search ................. 371/38.1, 40.1, 40.4, 371/51.1; 235/380, 381, 439

[56] References Cited

U.S. PATENT DOCUMENTS

| | | | |
|---|---|---|---|
| 4,777,355 | 10/1988 | Takahira | 235/380 |
| 4,780,602 | 10/1988 | Kawana et al. | 235/380 |
| 4,785,452 | 11/1988 | Petz et al. | 371/38 |
| 4,797,543 | 1/1989 | Watanabe | 235/380 |

*Primary Examiner*—Charles E. Atkinson

[57] ABSTRACT

An information recording medium includes a memory section for storing therein information inputted from an external apparatus, information generated internally on the basis of the inputted information, or converted information. The medium further includes a computing and processing section for performing control to write the above described information into the memory section, and a program storage section for storing therein control programs such as control program and write control program required for the computing and processing section to transfer/receive information to/from the external apparatus. A memory arrangement exists for the information recording medium wherein at least one of the plural memory sections and the program storage section comprise a fixed item information recording area. This area contains predetermined recording contents and information pieces with an error detection information piece and added per information item being stored into the fixed item information storage area. It further contains a variable item information storage area selected as occasion demands. Information with an error detection information piece is added per preset information length being stored into the variable item information storage area.

20 Claims, 2 Drawing Sheets

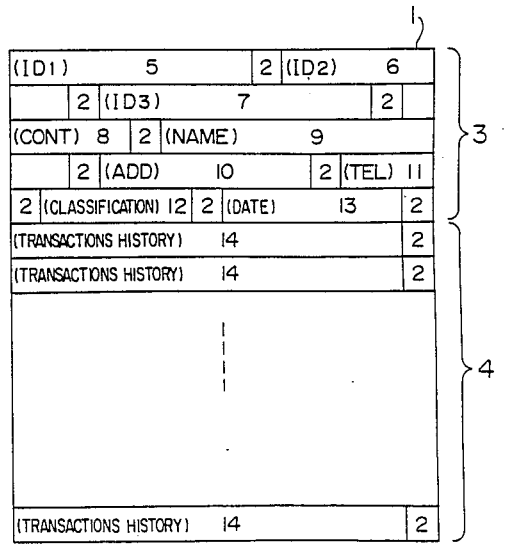

FIG. 1 PRIOR ART

| 5 | 6 | 7 | 2 |
|---|---|---|---|
| 8 | | | 2 |
| 9 | 10 | | 2 |
| 11 | 12 | | 2 |
| 13 | | | 2 |
| 14 | | | 2 |
| 14 | | | 2 |

{ 3 (rows 1–5), 4 (rows 6+) }

FIG. 2

| (ID1) 5 | 2 | (ID2) 6 | |
| 2 | (ID3) 7 | | 2 |
| (CONT) 8 | 2 | (NAME) 9 | |
| 2 | (ADD) 10 | 2 | (TEL) 11 |
| 2 | (CLASSIFICATION) 12 | 2 | (DATE) 13 | 2 |
| (TRANSACTIONS HISTORY) 14 | | | 2 |
| (TRANSACTIONS HISTORY) 14 | | | 2 |
| (TRANSACTIONS HISTORY) 14 | | | 2 |

FIG. 3

| (ID1) 5 | 2 | (ID2) 6 | |
|---|---|---|---|
| | 2 | (ID3) 7 | 2 |
| (CONT) 8 | 2 | (NAME) 9 | |
| | 2 | (ADD) 10 | 2 | (TEL) 11 |
| 2 | (CLASSIFICATION) 12 | 2 | (DATE) 13 | 2 |

(TRANSACTIONS HISTORY) 14
(TRANSACTIONS HISTORY) 14

(TRANSACTIONS HISTORY) 14

| 2 | 2 | 2 | 2 | 2 | 2 | 2 | 2 | --- |
| --- | --- | --- | --- | --- | --- | --- | --- | --- |
| | | | | --- | 2 | 2 | 2 | 2 |

MEMORY ARRANGEMENT UTILIZED FOR IC CARD

BACKGROUND OF THE INVENTION

1. Field of the Invention

The present invention relates to a memory arrangement for information on recording medium, and in particular to such improvement of an IC card that information may be efficiently stored into a memory.

2. Description of the Prior Art

Owing to high density packaging techniques and the like in recent years, respective memory devices have large storage capacities. However, there is a limit in the number of memory devices which can be mounted on an information recording medium such as an IC card. Storage of a larger amount of information and more functions than before are demanded. The amount of information stored thus increases steadily.

Information stored in a memory portion of an information recording medium such as an IC card is classified broadly into information which should be necessarily recorded on each IC card (fixed item information), information selectively recorded according to the purpose or application, and information arbitrarily recorded (variable item information).

In an information recording scheme for an IC card, a memory section for storing data or programs therein is divided into records respectively having fixed information lengths. Further, information inputting/outputting and error detection of recorded information are performed while taking a record as unit. In another information recording scheme, an arbitrary length is chosen to be a record according to the length of information recorded in the memory section. Also, information having variable length is accordingly stored, inputted and outputted. In this case, error detection of recorded information is performed while taking the variable record as a unit.

In the former case, error detection of recorded information can be performed easily. If the record length is detected and error detection of information recorded in the record is performed. However, areas of the memory section are unadvantageously wasted. On the other hand, the latter case has a drawback in that the amount of error detection information increases and the efficiency of use of the memory portion is lowered when the record length is extremely short. This is because error detection information for performing error detection of recorded information is added to each record.

FIG. 1 shows an example of a memory map of such prior art used in an IC card. A fixed item information storage area 3 and a variable item information storage area 4 are provided. Fixed item information and variable item information are continuously stored in respective storage areas. Error detection information is inserted at intervals of a fixed length. Assuming now that the recording information length (word length) of a memory 1 per line is 32 bytes. Fixed item information pieces 5 to 13 are handled while taking 32 bytes as unit a irrespective of the length of the information piece. Also error detection information 2 is recorded at the last position of 32-byte word.

Therefore, each of the fixed item information pieces 7 and 9 are divided by the error detection information and relates to two error detection information pieces.

It is now assumed that an error is caused in the fixed item information 5, which has been recorded, such as a secret identification number. The error is detected from the error detection information 2 of the fixed item information (secret identification number). Since the pertinent error detection information is common to the fixed term information 6 and the fixed term information 7, however, these are also judged erroneous and so processed.

On the other hand, transaction history information 14, stored in the variable item information storage area 4, differ in information length of one information unit, and a number of information units, according to the purpose and application. Accordingly, there occurs a difference in the recording efficiency of memory among IC cards which are different in purpose and application. The efficiency is thus lowered according to the purpose and application.

Any information stored in the fixed item information storage area 3 is very important to the operation of the IC card.

SUMMARY OF THE INVENTION

An object of the present invention is to provide a memory arrangement for an information recording medium whereby a problem of lowered use efficiency of the memory section caused in an IC card of the prior art by recording error detection information, is eliminated. Thereby an information recording medium having a high recording efficiency and a high error detection and processing efficiency is realized.

In accordance with a feature of the present invention, error detection information for recorded information is added to each information item of fixed item information (such as the name and secret identification number of a possessor). Further, detection information for recorded information is added to latter variable item information (such as transactions history information) at intervals of preset information length.

In accordance with configuration of a recording scheme for an information recording medium according to the present invention, aiming at the above described object, an information recording medium includes: a memory section for storing therein information inputted from an external apparatus, information generated internally on the basis of the inputted information, or converted information; a computing and processing section for performing control to write the above described information into the memory section; and a program storage section for storing therein control programs such as control program and write control program required for the computing and processing section to transfer/receive information to/from the external apparatus. At least one of the memory section and the program storage section comprises a fixed item information recording area having predetermined recording contents, information pieces with an error detection information piece added per information item being stored into the fixed item information storage area, and a variable item information storage area selected as occasion demands. Information with an error detection information piece added per preset information length being stored into the variable item information storage area.

Since the contents of fixed item information are predetermined, the amount of its recorded information for each item can be grasped. Even if error detection information is added to the fixed item area, therefore, it is possible to perform recording without causing a waste and thereby perform its error detection processing efficiently.

In variable items, selected items differ depending upon the purpose and application. Further, the length of information and its contents differ depending upon the item. For such variable item information, information is recorded while adding error detection information for recorded information at intervals of preset information length. As a result, error detection information and variable item information can be recorded without causing a waste.

BRIEF DESCRIPTION OF THE DRAWINGS

FIG. 1 is a schematic view of a memory map showing an example of an IC card of the prior art.

FIGS. 2 and 3 are schematic views of memory maps of embodiments wherein the recording scheme or memory arrangement for information recording medium according to the present invention are applied to IC cards.

DESCRIPTION OF THE PREFERRED EMBODIMENTS

An embodiment of the present invention will now be described in detail by referring to drawings.

FIGS. 2 and 3 are schematic views of memory maps of embodiments wherein the recording scheme for information recording medium according to the present invention are applied to IC cards.

Numeral 1 denotes a memory of an IC card, whereto a microprocessor (not illustrated) gains access to write/read information. The microprocessor transfers/receives information to/from an external apparatus such as a reader-writer with an IC card inserted thereon or a host computer via an interface (not illustrated). It then stores information inputted from an external apparatus or information generated internally or converted internally according to the inputted information into the memory 1.

By taking cashless shopping using an IC card as an example, contents of recorded information in the memory 1 is shown in FIG. 2.

The memory 1 is divided into a fixed item information storage area 3 and a variable item storage area 4. The area of the fixed item information storage area 3 is defined on the basis of calculation of the amount of the fixed items used, and the remaining area is allotted to the variable item information.

In FIG. 2, it is assumed that three kinds of secret identification numbers are used in a card and three secret identification numbers are allotted to the beginning of the fixed item information storage area 3. These are secret identification number ($ID_1$) 5, secret identification number ($ID_2$) 6 and secret identification number ($ID_3$) 7. Error detection information 2 is added to the end position of each of these three secret identification numbers. After these three secret identification numbers, a secret identification number noncoincidence count recording area (CONT) 8 is secured. The error detection information 2 is added to the last position of the secret identification number noncoincidence count recording area (CONT) 8 as well.

An information piece recorded as the next fixed item is herein a possessor's name (NAME) 9. Succeedingly, a card possessor's address (ADD) 10, a card possessor's telephone number (TEL) 11, a card classification 12, and issue date 13 are recorded one after another. Error detection information 2 is added at the last position of each of these fixed item information pieces as well.

These fixed item information pieces are indispensable to respective IC cards and common to nearly all IC cards. These are defined beforehand and the length of them is already known. The order of the recording arrangement of these fixed item information pieces is not fixed, but selected for respective cards.

Unlike the fixed item information, variable item information, represented by transactions history information 14, often differs in recording format depending upon purpose and application. Concrete examples of this transactions history information 14 are transactions history information in a retail store A, transactions history information in a retail store B, and deposited amount in a bank A. These transactions history information pieces 14 are not constant in length. Therefore, error detection information 2 is inserted at intervals of constant length, for example, 32 bytes at the last position of each interval (such as the illustrated rightmost position of the memory 1).

When an IC card is used and the possessor's name (NAME) 9, for example, is to be read out, it is read out after the competence to readout of the pertinent area has been checked. The microprocessor, which is the processing portion of the IC card, also reads out the error detection information 2 concurrently with readout of the possessor's name (NAME) from the memory 1. The microprocessor then performs error detection processing of recorded information by using the error detection information 2. It thereafter sends out the information read out to an external apparatus.

If an information error is caused in the recorded secret identification number ($ID_1$) 5 under the present recording scheme, the error is detected from the error detection information 2 of the secret identification number ($ID_1$) 5. Since, in this case, the pertinent error detection information is common to neither the secret identification number ($ID_2$) 6 nor to the secret identification number ($ID_1$) 7, these are not judged erroneous. This is clearly unlike the prior art previously described with regard to FIG. 1.

As for the transactions history information 14, error detection information 2 is added at intervals of preset information length, for example, 32 bytes, in order to perform the addition of error detection information independently of recording length. When a certain piece of information has been manipulated in this case, it is always necessary to renew and rerecord a single error detection information piece 2, or a plurality of error detection information pieces 2, pertinent to the manipulated information.

In an embodiment illustrated in FIG. 3, an error detection information storage area 15 for storing therein only error detection information 2 therein is provided. Also error detection information pieces 2 for transactions history information pieces 14 illustrated in FIG. 2 are concentrated to the area 15 as shown in FIG. 3.

Embodiments have heretofore been described stressing a memory for storing data therein. As a matter of course, however, the present invention is similarly applicable to a memory for storing programs in which fixed item information or the like is stored.

Embodiments have heretofore been described stressing stress on an IC card. As a matter of course, however, the present invention is applicable to various information storage media such as another memory card incorporating a microprocessor therein and a memory cartridge, for example.

In accordance with the present invention heretofore described, error detection information for recorded information is added to each information item for fixed item information indispensable to an IC card. It is also added at intervals of preset information length for variable item information which is variable according to the purpose and application of the IC card. Without depending upon the purpose and application of the IC card, therefore, constant recording efficiency can always be maintained and error detection processing can be efficiently performed.

I claim:

1. A memory arrangement system for a memory device to provide efficient and accurate error detection, comprising:
    first memory storage area, including plural memory locations, arranged in sequential intervals of constant byte length; and
    second memory storage area, including plural memory locations, arranged in sequential intervals of constant byte length;
    said first memory storage area storing a plurality of fixed information data, each of a constant byte length, and corresponding error detection data, wherein each of said fixed information data and corresponding error detection data are sequentially stored in said sequential intervals of plural memory locations;
    said second memory storage area storing a plurality of variable information data, each of a variable byte length, and error detection data of a constant byte length, wherein said error detection data is stored in predetermined plural memory locations of each of said sequential intervals and each of said variable information data are sequentially stored in the remaining plural memory locations of each of said sequential intervals to thereby create a memory arrangement system capable of providing efficient and accurate error detection.

2. The system of claim 1, wherein said memory device is one of an IC card.

3. The system of claim 2, wherein said fixed information data includes at least one fixed information data selected from the group consisting of secret identification number, secret identification noncoincidence count number, name, address, telephone number, card classification, and issue date.

4. The system of claim 1, wherein said error detection data corresponding to each of said fixed information data is of a constant byte length.

5. The system of claim 1, wherein said constant byte length of said sequential intervals of each of said first and second storage areas is thirty-two (32) bytes.

6. The system of claim 5, wherein said error detection data of a constant byte length, stored in said second memory storage area, is stored in the last two byte memory locations of each sequential memory locations.

7. The system of claim 1, wherein said error detection data of a constant byte length equals two (2) bytes in length.

8. The system of claim 1, wherein said fixed information data are forms of identification.

9. The system of claim 1, wherein said variable information data is data comprising a program.

10. The system of claim 1, wherein said variable information data are data of a transaction history.

11. A method of providing efficient and accurate error detection through arrangement of data in a memory, said method comprising the steps of:
    (a) storing a plurality of fixed information data, each of a constant byte length, and corresponding plural error detection data in a first memory storage area of the memory, each of said plurality of fixed information data and each corresponding error detection data being sequentially stored;
    (b) storing a plurality of variable information data, each of a variable byte length, and plural error detection data of a constant byte length in a second memory storage area of the memory, each of said plural error detection data of a constant byte length being stored in predetermined plural memory locations of each of a plurality of sequential intervals in said second memory storage area and each of a said plurality of variable information data being sequentially stored in remaining memory locations of each of said sequential intervals;
    (c) accessing the error detection data in each of the first and second storage areas of the memory;
    (d) detecting errors, by utilizing the accessed error detection data, corresponding to each of said fixed information data and sequential intervals of the variable information data which are in error, to thereby provide accurate and efficient error detection.

12. The method of claim 11, wherein said method is utilized in a memory of an IC card.

13. The method of claim 12, wherein said fixed information data includes at least one fixed information data selected from the group consisting of secret identification number, secret identification noncoincidence count number, name, address, telephone number, card classification, and issue date.

14. The method of claim 11, wherein said error detection data corresponding to each of said fixed information date is of a constant byte length.

15. The method of claim 11, wherein said constant byte length of said sequential intervals of each of said first and second storage areas is thirty-two (32) bytes.

16. The method of claim 15, wherein said error detection data of a constant byte length, stored in said second memory storage area, is stored in the last two byte memory locations of each sequential memory locations.

17. The method of claim 11, wherein said error detection data of a constant byte length equals two (2) bytes in length.

18. The method of claim 11, wherein said fixed information data area are forms of identification.

19. The method of claim 11, wherein said variable information data is comprising a program.

20. The method of claim 11, wherein said variable information data are data of a transaction history.

* * * * *